(12) United States Patent
Liu

(10) Patent No.: US 11,856,498 B2
(45) Date of Patent: Dec. 26, 2023

(54) BLUETOOTH DEVICE CONNECTION METHOD AND DEVICE

(71) Applicant: Honor Device Co., Ltd., Shenzhen (CN)

(72) Inventor: Xiuhua Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 62 days.

(21) Appl. No.: 17/418,293

(22) PCT Filed: Dec. 26, 2018

(86) PCT No.: PCT/CN2018/123782
§ 371 (c)(1),
(2) Date: Jun. 25, 2021

(87) PCT Pub. No.: WO2020/132922
PCT Pub. Date: Jul. 2, 2020

(65) Prior Publication Data
US 2022/0060872 A1     Feb. 24, 2022

(51) Int. Cl.
*H04W 4/80*        (2018.01)
*H04W 76/10*      (2018.01)

(52) U.S. Cl.
CPC ............. *H04W 4/80* (2018.02); *H04W 76/10* (2018.02)

(58) Field of Classification Search
CPC ........ H04W 4/80; H04W 76/10; H04W 12/50
See application file for complete search history.

(56) References Cited

U.S. PATENT DOCUMENTS

| 9,256,386 B2 | 2/2016 | Lee et al. |
| 9,265,080 B1 | 2/2016 | Palin et al. |
| 9,641,678 B2 | 5/2017 | Berry et al. |
| 9,648,108 B2 | 5/2017 | Granqvist et al. |
| 11,323,880 B2 | 5/2022 | Cho et al. |
| 2015/0296020 A1 | 10/2015 | Granqvist et al. |
| 2016/0128114 A1 | 5/2016 | Moy et al. |

(Continued)

FOREIGN PATENT DOCUMENTS

| CN | 104077169 | * 10/2014 | ............. G06F 9/445 |
| CN | 104077169 A | 10/2014 | |

(Continued)

*Primary Examiner* — Tuan H Nguyen
(74) *Attorney, Agent, or Firm* — RIMON P.C.

(57) ABSTRACT

A Bluetooth communication system, including first and second Bluetooth devices. The second device includes a second Bluetooth application and a second Bluetooth host. The first device sends advertising information that includes UUID information of a service supported by the first device; the second host receives the advertising information, the advertising information includes the UUID information of the service supported by the first device; the second host stores and parses the UUID information, and sends a pairing request to the first device; the first device pairs with the second device; the second device instructs the second host to report pairing to the second application, the pairing information including UUID information of the service supported by the first device; the second Bluetooth device sends a service connection request to the first device; and the first device is further configured to establish a service connection to the second device.

12 Claims, 10 Drawing Sheets

(56) References Cited

U.S. PATENT DOCUMENTS

2016/0366715 A1* 12/2016 Murayama .............. H04W 4/80
2017/0214748 A1    7/2017 Granqvist et al.
2018/0329896 A1* 11/2018 Goethals ................. G10L 13/00

FOREIGN PATENT DOCUMENTS

| CN | 104469980 A | 3/2015 |
| CN | 105122771 A | 12/2015 |
| CN | 106788612 A | 5/2017 |
| CN | 107197424 A | 9/2017 |
| RU | 2540773 C2 | 2/2015 |
| WO | 2017210980 A1 | 12/2017 |
| WO | 2018199501 A1 | 11/2018 |

\* cited by examiner

BLUETOOTH DEVICE CONNECTION METHOD AND DEVICE

CROSS-REFERENCE TO RELATED APPLICATIONS

This application is a national stage of International Application No. PCT/CN2018/123782, filed on Dec. 26, 2018, which is hereby incorporated by reference in its entirety.

TECHNICAL FIELD

The embodiments relate to the field of mobile communication, and in particular, to a Bluetooth device connection method and an apparatus.

BACKGROUND

Bluetooth is a wireless communication technology standard that allows mobile devices to exchange data over short distances. The Bluetooth communication method includes classic Bluetooth (Basic Rate/Enhanced Data Rate, BR/EDR) and Bluetooth low energy (BLE). Compared with the classic Bluetooth, the Bluetooth low energy can transmit more data by using less energy.

In the conventional technology, a Bluetooth device, after pairing, needs to obtain a service that can be provided by another Bluetooth device paired with the previous Bluetooth device through a service discovery process, and based on service information carried in interaction information about the service discovery process, to determine whether to start a corresponding service connection. However, the service discovery process needs to consume a relatively long period of time. Consequently, a probability of a problem is increased.

SUMMARY

To resolve the foregoing problem, the embodiments provide a Bluetooth device connection method and a device. The solutions are as follows.

According to a first aspect, an embodiment provides a Bluetooth device, including: a Bluetooth module, configured to communicate with another Bluetooth device, where the Bluetooth module includes a Bluetooth host and a Bluetooth application, and the Bluetooth module further includes one or more processors; and a memory, where the memory includes instructions. When the instructions are executed by the one or more processors, the Bluetooth device is enabled to perform the following operations: searching for an available Bluetooth device; receiving advertising information sent by the available Bluetooth device, where the available Bluetooth device includes a first Bluetooth device, and advertising information of the first Bluetooth device includes UUID information of a service supported by the first Bluetooth device; storing and parsing the UUID information that is of the service supported by the first Bluetooth device and that is included in the advertising information of the first Bluetooth device; instructing the Bluetooth host to pair with the first Bluetooth device; instructing the Bluetooth host to report pairing information to the Bluetooth application, where the pairing information includes the UUID information of the service supported by the first Bluetooth device; and establishing a service connection to the first Bluetooth device based on the UUID information of the service supported by the first Bluetooth device. An advantage of this manner is that a long service discovery step does not need to be performed when the Bluetooth device establishes the service connection to the first Bluetooth device, so that connection time is shortened, and power consumption of the Bluetooth device is reduced.

In a possible implementation, the advertising information is Bluetooth low energy advertising. An advantage of this manner is that time and power consumption of a Bluetooth low energy connection can be further reduced. For example, it is assumed that the Bluetooth device is a smartphone. When the smartphone and a Bluetooth headset are connected in a Bluetooth low energy connection manner, power consumption of the Bluetooth headset can be effectively reduced, and use time of the Bluetooth headset can be prolonged.

In another possible implementation, the advertising information is extended inquiry response information. An advantage of this manner is that a service discovery process during a classic Bluetooth connection is time-consuming and error-prone; in this manner, however, the Bluetooth device receives the UUID information by using the advertising information, so that the service discovery process can be effectively avoided, and a probability of a classic Bluetooth connection error can be lowered.

In another possible implementation, the UUID information of the service supported by the first Bluetooth device includes UUID information of a voice hands-free profile (HFP) and an advanced audio distribution profile (A2DP). An advantage of this manner is that currently audio transmission mainly depends on the classic Bluetooth connection, but power consumption of the classic Bluetooth connection is relatively high, and consequently, for a small Bluetooth device, for example, a Bluetooth headset, use time is severely affected; however, if the audio transmission is performed in the Bluetooth low energy connection manner, use time of the Bluetooth headset can be effectively prolonged.

With reference to the first aspect, the Bluetooth device may be a smartphone.

According to a second aspect, an embodiment provides another Bluetooth device, including: a Bluetooth module, configured to communicate with another Bluetooth device, where the Bluetooth module further includes one or more processors; and a memory, including instructions. When the instructions are executed by the one or more processors, the Bluetooth device is enabled to perform the following operations: sending advertising information, where the advertising information includes UUID information of a service supported by the Bluetooth device; receiving a pairing request of a first Bluetooth device; pairing with the first Bluetooth device in response to the pairing request of the first Bluetooth device; receiving a service connection request of the first Bluetooth device, where the service connection request of the first Bluetooth device includes a part or all of the UUID information of the service supported by the Bluetooth device; and establishing a service connection to the first Bluetooth device in response to the service connection request of the first Bluetooth device. An advantage of this manner is that the foregoing Bluetooth device adds the UUID information of the service supported by the Bluetooth device to the advertising information, so that the first Bluetooth device that receives the advertising information of the foregoing Bluetooth device does not need to perform a service discovery process to request the UUID information of the service supported by the Bluetooth device from the foregoing Bluetooth device. This can effectively shorten connection time and reduce power consumption.

In a possible implementation, the advertising information is Bluetooth low energy advertising. An advantage of this manner is that time and power consumption of a Bluetooth low energy connection can be further reduced. For example, it is assumed that the Bluetooth device is a Bluetooth headset. When a smartphone and the Bluetooth headset are connected in a Bluetooth low energy connection manner, power consumption of the Bluetooth headset can be effectively reduced, and use time of the Bluetooth headset can be prolonged.

In another possible implementation, the advertising information is extended inquiry response information. An advantage of this manner is that a service discovery process during a classic Bluetooth connection is time-consuming and error-prone; in this manner, however, the Bluetooth device receives the UUID information by using the advertising information, so that the service discovery process can be effectively avoided, and a probability of a classic Bluetooth connection error can be lowered.

In another possible implementation, the UUID information of the service supported by the first Bluetooth device includes UUID information of a voice hands-free profile (HFP) and an advanced audio distribution profile (A2DP). An advantage of this manner is that currently audio transmission mainly depends on the classic Bluetooth connection, but power consumption of the classic Bluetooth connection is relatively high, and consequently, for a small Bluetooth device, for example, a Bluetooth headset, use time is severely affected; however, if the audio transmission is performed in the Bluetooth low energy connection manner, use time of the Bluetooth headset can be effectively prolonged.

With reference to the second aspect, the Bluetooth device may be a Bluetooth headset.

According to a third aspect, an embodiment provides a Bluetooth communication method applied to a Bluetooth device. The Bluetooth device includes a Bluetooth host and a Bluetooth application. The method includes: searching for an available Bluetooth device; receiving advertising information sent by the available Bluetooth device, where the available Bluetooth device includes a first Bluetooth device, and advertising information of the first Bluetooth device includes UUID information of a service supported by the first Bluetooth device; storing and parsing the UUID information that is of the service supported by the first Bluetooth device and that is included in the advertising information of the first Bluetooth device; instructing the Bluetooth host to pair with the first Bluetooth device; instructing the Bluetooth host to report pairing information to the Bluetooth application, where the pairing information includes the UUID information of the service supported by the first Bluetooth device; and establishing a service connection to the first Bluetooth device based on the UUID information of the service supported by the first Bluetooth device. An advantage of this manner is that a long service discovery step does not need to be performed when the Bluetooth device establishes the service connection to the first Bluetooth device, so that connection time is shortened, and power consumption of the Bluetooth device is reduced.

In a possible implementation, the advertising information is Bluetooth low energy advertising. An advantage of this manner is that time and power consumption of a Bluetooth low energy connection can be further reduced. For example, it is assumed that the Bluetooth device is a smartphone. When the smartphone and a Bluetooth headset are connected in a Bluetooth low energy connection manner, power consumption of the Bluetooth headset can be effectively reduced, and use time of the Bluetooth headset can be prolonged.

In another possible implementation, the advertising information is extended inquiry response information. An advantage of this manner is that a service discovery process during a classic Bluetooth connection is time-consuming and error-prone;—in this manner, however, the Bluetooth device receives the UUID information by using the advertising information, so that the service discovery process can be effectively avoided, and a probability of a classic Bluetooth connection error can be lowered.

In another possible implementation, the UUID information of the service supported by the first Bluetooth device includes UUID information of a voice hands-free profile (HFP) and an advanced audio distribution profile (A2DP). An advantage of this manner is that currently audio transmission mainly depends on the classic Bluetooth connection, but power consumption of the classic Bluetooth connection is relatively high, and consequently, for a small Bluetooth device, for example, a Bluetooth headset, use time is severely affected; however, if the audio transmission is performed in the Bluetooth low energy connection manner, use time of the Bluetooth headset can be effectively prolonged.

With reference to the third aspect, the Bluetooth device may be a smartphone.

According to a fourth aspect, an embodiment provides another Bluetooth communication method applied to a Bluetooth device. The method includes: sending advertising information, wherein the advertising information includes UUID information of a service supported by the electronic device; receiving a pairing request of a first Bluetooth device; pairing with the first Bluetooth device in response to the pairing request of the first Bluetooth device; receiving a service connection request of the first Bluetooth device, where the service connection request of the first Bluetooth device includes a part or all of the UUID information of the service supported by the Bluetooth device; and establishing a service connection to the first Bluetooth device in response to the service connection request of the first Bluetooth device. An advantage of this manner is that the foregoing Bluetooth device adds the UUID information of the service supported by the Bluetooth device to the advertising information, so that the first Bluetooth device that receives the advertising information of the foregoing Bluetooth device does not need to perform a service discovery process to request the UUID information of the service supported by the Bluetooth device from the foregoing Bluetooth device. This can effectively shorten connection time and reduce power consumption.

In a possible implementation, the advertising information is Bluetooth low energy advertising. An advantage of this manner is that time and power consumption of a Bluetooth low energy connection can be further reduced. For example, it is assumed that the Bluetooth device is a Bluetooth headset. When a smartphone and the Bluetooth headset are connected in a Bluetooth low energy connection manner, power consumption of the Bluetooth headset can be effectively reduced, and use time of the Bluetooth headset can be prolonged.

In another possible implementation, the advertising information is extended inquiry response information. An advantage of this manner is that a service discovery process during a classic Bluetooth connection is time-consuming and error-prone; in this manner, however, the Bluetooth device receives the UUID information by using the advertising information, so that the service discovery process can be effectively avoided, and a probability of a classic Bluetooth connection error can be lowered.

In another possible implementation, the UUID information of the service supported by the first Bluetooth device includes UUID information of a voice hands-free profile (HFP) and an advanced audio distribution profile (A2DP). An advantage of this manner is that currently audio transmission mainly depends on the classic Bluetooth connection, but power consumption of the classic Bluetooth connection is relatively high, and consequently, for a small Bluetooth device, for example, a Bluetooth headset, use time is severely affected; however, if the audio transmission is performed in the Bluetooth low energy connection manner, use time of the Bluetooth headset can be effectively prolonged.

With reference to the fourth aspect, the Bluetooth device may be a Bluetooth headset.

According to a fifth aspect, an embodiment provides a system, including a first Bluetooth device and a second Bluetooth device. The second Bluetooth device includes a second Bluetooth application and a second Bluetooth host. The first Bluetooth device is configured to send advertising information, and the advertising information includes UUID information of a service supported by the first Bluetooth device. The second Bluetooth host is configured to perform the following operations: searching for an available Bluetooth device, and receiving advertising information sent by the available Bluetooth device, where the available Bluetooth device includes the first Bluetooth device, and advertising information of the first Bluetooth device includes the UUID information of the service supported by the first Bluetooth device; storing and parsing the UUID information that is of the service supported by the first Bluetooth device and that is included in the advertising information of the first Bluetooth device; and sending a pairing request to the first Bluetooth device. The first Bluetooth device is further configured to perform the following operations: receiving a pairing request of the second Bluetooth device; and pairing with the second Bluetooth device in response to the pairing request of the second Bluetooth device. The second Bluetooth device is further configured to perform the following operations: instructing the second Bluetooth host to report pairing information to the second Bluetooth application, where the pairing information includes the UUID information of the service supported by the first Bluetooth device; and sending a service connection request to the first Bluetooth device based on the UUID information of the service supported by the first Bluetooth device. The first Bluetooth device is further configured to perform the following operations: receiving the service connection request of the second Bluetooth device; and establishing a service connection to the second Bluetooth device in response to receiving the service connection request of the second Bluetooth device. An advantage of this manner is that neither the first Bluetooth device nor the second Bluetooth device needs to perform a service discovery process, and a service connection can be directly established.

In a possible implementation, the advertising information is Bluetooth low energy advertising. An advantage of this manner is that time and power consumption of a Bluetooth low energy connection can be further reduced. For example, it is assumed that the Bluetooth device is a Bluetooth headset. When a smartphone and the Bluetooth headset are connected in a Bluetooth low energy connection manner, power consumption of the Bluetooth headset can be effectively reduced, and use time of the Bluetooth headset can be prolonged.

In another possible implementation, the advertising information is extended inquiry response information. An advantage of this manner is that a service discovery process during a classic Bluetooth connection is time-consuming and error-prone; in this manner, however, the Bluetooth device receives the UUID information by using the advertising information, so that the service discovery process can be effectively avoided, and a probability of a classic Bluetooth connection error can be lowered.

In another possible implementation, the UUID information of the service supported by the first Bluetooth device includes UUID information of a voice hands-free profile (HFP) and an advanced audio distribution profile (A2DP). An advantage of this manner is that currently audio transmission mainly depends on the classic Bluetooth connection, but power consumption of the classic Bluetooth connection is relatively high, and consequently, for a small Bluetooth device, for example, a Bluetooth headset, use time is severely affected; however, if the audio transmission is performed in the Bluetooth low energy connection manner, use time of the Bluetooth headset can be effectively prolonged.

With reference to the fifth aspect, the first Bluetooth device may be a Bluetooth headset, and the second Bluetooth device may be a smartphone.

According to a sixth aspect, an embodiment provides a Bluetooth chip, including: a memory, configured to store a program; and a processor, configured to execute the program stored in the memory. The program may implement functions of a Bluetooth host and a Bluetooth application, so that the Bluetooth chip performs the following operations: searching for an available Bluetooth device; receiving advertising information sent by the available Bluetooth device, where the available Bluetooth device includes a first Bluetooth device, and advertising information of the first Bluetooth device includes UUID information of a service supported by the first Bluetooth device; storing and parsing the UUID information that is of the service supported by the first Bluetooth device and that is included in the advertising information of the first Bluetooth device; instructing the Bluetooth host to pair with the first Bluetooth device; instructing the Bluetooth host to report pairing information to the Bluetooth application of the electronic device, where the pairing information includes the UUID information of the service supported by the first Bluetooth device; and establishing a service connection to the first Bluetooth device based on the UUID information of the service supported by the first Bluetooth device. An advantage of this manner is that a long service discovery step does not need to be performed when the Bluetooth chip establishes the service connection to the first Bluetooth device, so that connection time is shortened, and power consumption of the Bluetooth device is reduced.

In a possible implementation, the advertising information is Bluetooth low energy advertising. An advantage of this manner is that time and power consumption of a Bluetooth low energy connection can be further reduced. For example, it is assumed that the Bluetooth chip is used in a smartphone. When the smartphone and a Bluetooth headset are connected in a Bluetooth low energy connection manner, power consumption of the Bluetooth headset can be effectively reduced, and use time of the Bluetooth headset can be prolonged.

In another possible implementation, the advertising information is extended inquiry response information. An advantage of this manner is that a service discovery process during a classic Bluetooth connection is time-consuming and error-prone; in this manner, however, the Bluetooth chip receives the UUID information by using the advertising information, so that the service discovery process can be effectively avoided, and a probability of a classic Bluetooth connection error can be lowered.

In another possible implementation, the UUID information of the service supported by the first Bluetooth device includes UUID information of a voice hands-free profile (HFP) and an advanced audio distribution profile (A2DP). An advantage of this manner is that currently audio transmission mainly depends on the classic Bluetooth connection, but power consumption of the classic Bluetooth connection is relatively high, and consequently, for a small Bluetooth device, for example, a Bluetooth headset, use time is severely affected; however, if the audio transmission is performed in the Bluetooth low energy connection manner, use time of the Bluetooth headset can be effectively prolonged.

According to a seventh aspect, an embodiment provides another Bluetooth chip, including: a memory, configured to store a program; and a processor, configured to execute the program stored in the memory, so that the Bluetooth chip performs the following operations: sending advertising information, where the advertising information includes UUID information of a service supported by the electronic device; receiving a pairing request of a first Bluetooth device; pairing with the first Bluetooth device in response to the pairing request of the first Bluetooth device; receiving a service connection request of the first Bluetooth device, where the service connection request of the first Bluetooth device includes a part or all of the UUID information of the service supported by the Bluetooth device; and establishing a service connection to the first Bluetooth device in response to the service connection request of the first Bluetooth device. An advantage of this manner is that the foregoing Bluetooth chip adds the UUID information of the service supported by the Bluetooth device to the advertising information, so that the first Bluetooth device that receives the advertising information of the foregoing Bluetooth device does not need to perform a service discovery process to request the UUID information of the service supported by the Bluetooth device from the foregoing Bluetooth device. This can effectively shorten connection time and reduce power consumption.

In a possible implementation, the advertising information is Bluetooth low energy advertising. An advantage of this manner is that time and power consumption of a Bluetooth low energy connection can be further reduced. For example, it is assumed that the Bluetooth device is applied to a Bluetooth headset. When a smartphone and the Bluetooth headset are connected in a Bluetooth low energy connection manner, power consumption of the Bluetooth headset can be effectively reduced, and use time of the Bluetooth headset can be prolonged.

In another possible implementation, the advertising information is extended inquiry response information. An advantage of this manner is that a service discovery process during a classic Bluetooth connection is time-consuming and error-prone; in this manner, however, the Bluetooth device receives the UUID information by using the advertising information, so that the service discovery process can be effectively avoided, and a probability of a classic Bluetooth connection error can be lowered.

In another possible implementation, the UUID information of the service supported by the first Bluetooth device includes UUID information of a voice hands-free profile (HFP) and an advanced audio distribution profile (A2DP). An advantage of this manner is that currently audio transmission mainly depends on the classic Bluetooth connection, but power consumption of the classic Bluetooth connection is relatively high, and consequently, for a small Bluetooth device, for example, a Bluetooth headset, use time is severely affected; however, if the audio transmission is performed in the Bluetooth low energy connection manner, use time of the Bluetooth headset can be effectively prolonged.

DETAILED DESCRIPTION OF THE EMBODIMENTS

The following describes solutions in the embodiments in detail with reference to the accompanying drawings.

A Bluetooth device involved in the embodiments may be a Bluetooth low energy device, or may be a classic Bluetooth device, or may be a Bluetooth device that supports classic Bluetooth and Bluetooth low energy. The Bluetooth device may be a mobile phone, a tablet computer, a desktop computer, a laptop computer, an ultra-mobile personal computer (UMPC), a handheld computer, a netbook, a personal digital assistant (PDA), a wearable Bluetooth device, a virtual reality device, or the like. This is not limited in the embodiments. Bluetooth devices are connected with each other through Bluetooth to form a network. A connection initiator is a master device (Master), and a connection receiver is a slave device (Slave). All of the devices share a clock of the master device.

Bluetooth involved in the embodiments is a wireless communication standard for short-range data exchange, and works in an unlicensed frequency band 2.4 GHz. The Bluetooth may include classic Bluetooth (Basic Rate/Enhanced Data Rate, BR/EDR) and Bluetooth low energy (BLE). The classic Bluetooth may also be referred to as conventional Bluetooth or standard Bluetooth. The classic Bluetooth is developed and perfected based on Bluetooth of previous Bluetooth specification protocol versions 1.0, 1.2, 2.0+EDR, 2.1+EDR, 3.0+HS, and the like, and is a common name after the Bluetooth low energy appears. The Bluetooth low energy may also be referred to as Bluetooth Smart, is developed based on the Wibree standard of Nokia, and is originally introduced in the Bluetooth specification protocol version 4.0. Power consumption of a Bluetooth low energy technology is $\frac{1}{10}$ or less of that of the classic Bluetooth. The Bluetooth low energy is characterized by a short packet, efficient coding, a short connection establishment time period, and the like. A Bluetooth technology can simultaneously transmit voices and data, and use circuit switching and packet switching technologies to support asynchronous data channels, three voice channels, and channels for simultaneous transmission of asynchronous data and synchronous voices. The Bluetooth has two link types: asynchronous connectionless (ACL) and synchronous connection-oriented (SCO).

Figure 1A:
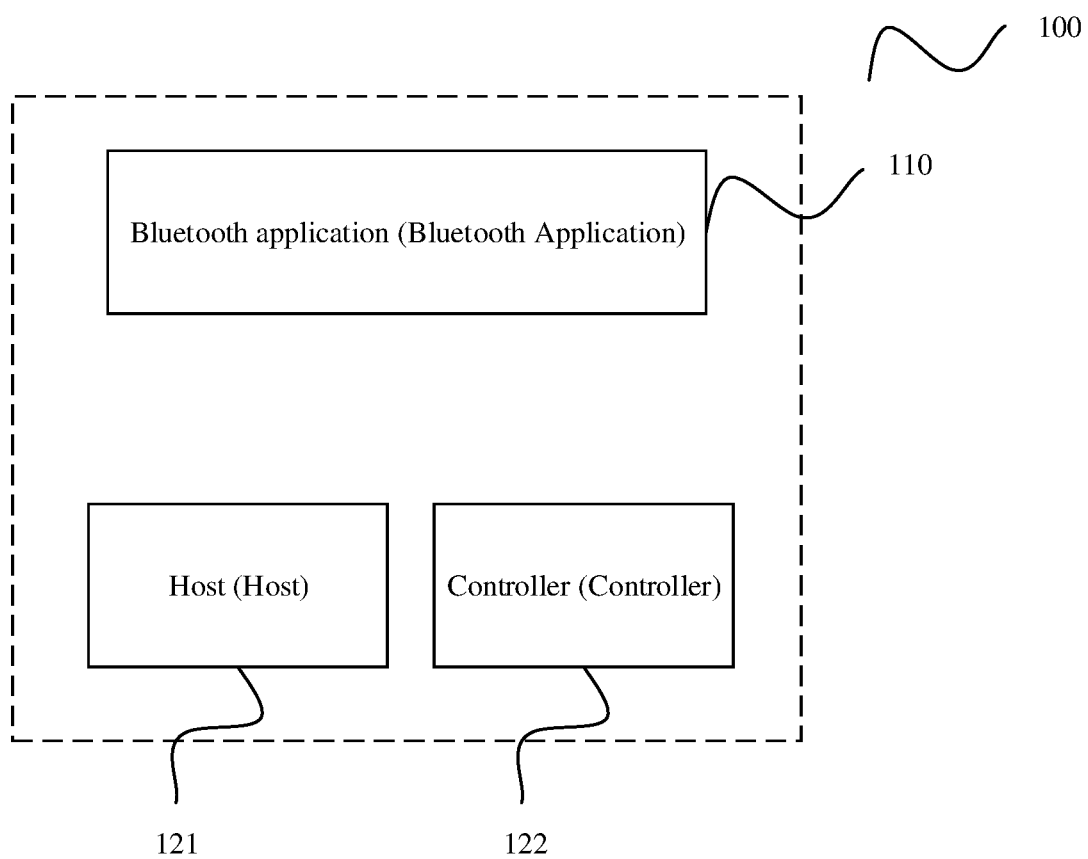
FIG. 1A shows a Bluetooth protocol stack according to an embodiment.

FIG. 1A shows a Bluetooth protocol stack 100 according to an embodiment. The Bluetooth protocol stack 100 is used to specify behavior of mutual communication between Bluetooth devices. A Bluetooth device discovers and uses, by using a Bluetooth protocol stack, a service that can be provided by a nearby Bluetooth device. The Bluetooth protocol stack 100 allows devices manufactured by different Bluetooth manufacturers to establish a Bluetooth connection and transmit data to each other. The Bluetooth protocol stack 100 specifies a layered data transmission architecture and various protocols, to process data transmission between two Bluetooth devices, so as to implement a specified service.

A protocol specified in the Bluetooth protocol stack 100 may be divided into three virtual processing units: a Bluetooth application 110, a host 121, and a controller 122. There may be one or more controllers 122. A protocol at a Bluetooth connection physical layer is mainly involved, where a physical layer (PHY) and a link layer (LL) are included. There is usually only one host 121, and the host 121 is configured to connect the Bluetooth application 110 to the controller 122. The host 121 is usually developed and maintained by a Bluetooth software vendor, and the controller 122 is usually provided by a Bluetooth manufacturer. The host 121 and the controller 122 may run on a same processor, or may run on different processors. The processor may be a Bluetooth chip, or may be a CPU.

Communication and interaction between the host 121 and the controller 122 are completed through a host controller interface (HCI). The host controller interface provides a standardized interface for the communication between the host 121 and the controller 122, and mainly completes two tasks: 1. Send a command to the controller and receive an event from the controller. 2. Send and receive data from another Bluetooth device. In short, the controller 122 is responsible for data transmission at a physical layer. The Bluetooth application 110 sends an instruction to the host 121 according to requirements. The host 121 converts the instruction of the Bluetooth application 110, and sends a signal to the controller 122 through the host controller interface. In this way, a developer of the Bluetooth application does not need to care about implementation of the Bluetooth at a physical layer.

In the classic Bluetooth protocol, the host 121 may include a logical link control and adaptation protocol (L2CAP), a service discovery protocol (SDP), and a generic access profile (GAP).

The SDP is a core protocol in a Bluetooth protocol system. A Bluetooth device can obtain a service of another Bluetooth device and characteristics of the service only by using the SDP, and establish a connection to each other based on the SDP. Through this protocol, the Bluetooth application can discover an available service and characteristics of the service. The service includes one or more characteristics. For example, a heart rate detection service provided by a Huawei band includes two characteristics: one is used to describe location information of a heart rate sensor, and the other is used to measure heart rate data. The characteristics of the service include at least two attributes: One is used to declare information such as a type of attribute data, and the other is used to store the attribute data. An attribute is a piece of labeled data that can be addressed. An attribute type is identified by a universal unique identifier (UUID). Each attribute has a corresponding UUID, and the UUID is used to identify different characteristics. The UUID may be 16 bits in a short format, or may be 128 bits in a full format. In other words, the SDP specifies a UUID corresponding to each service. By using UUID information, Bluetooth devices that share a same set of UUID information can discover a corresponding service, and perform operations such as reading and writing. For example, the heart rate detection service provided by the Huawei band includes two characteristics, each characteristic has a corresponding UUID, and a Huawei phone also uses the same UUIDs to identify the two characteristics. When the Huawei phone receives the UUIDs of the heart rate detection service sent by the Huawei band, it indicates that the Huawei band supports the heart rate detection service.

The L2CAP combines different channels into a data stream, for example, segments a higher layer service data unit (SDU) into smaller protocol data units (PDU), and segments each PDU into data packets, to submit the data packets to a baseband layer and transmit the data packets through an air interface. In addition, the L2CAP further provides buffer management, to ensure channel availability and a given Quality of Service (QoS). The baseband layer is used to specify or implement a service connection and a physical layer program in a Bluetooth connection, to support real-time voice, data information exchange, and the like between the Bluetooth devices.

The GAP is responsible for processing a device access mode and process, including device discovery, link establishment, link termination, security function enabling, and device configuration.

In the Bluetooth low energy protocol, the host 121 includes an L2CAP, an attribute protocol (ATT), a general attribute profile (GATT), a security manager protocol (SMP), and a GAP. For functions of the L2CAP and the GAP, refer to the L2CAP and the GAP in the classic Bluetooth.

In the ATT protocol, a Bluetooth device that provides data is referred to as a server, and a Bluetooth device that obtains data is referred to as a client. The server may be a master device, or may be a slave device. For example, a Bluetooth connection is established between a Huawei phone and a Huawei band, and during the Bluetooth connection, the Huawei phone is the master device, and the Huawei band is the slave device. When the Huawei band provides data for the Huawei phone, the Huawei band is the server, and the Huawei phone is the client. However, when the Huawei phone provides data for the Huawei band, the Huawei phone is the server, and the Huawei band is the client.

The ATT determines how the client obtains and uses an attribute. ATT protocol operation commands include "request", "response", "command", "notification", "indication", and "acknowledgment".

The GATT is a new layer designed for the Bluetooth low energy. The GATT is constructed based on the ATT, establishes some general operations and frameworks for ATT protocol transmission and data storage, defines services and service characteristics, and specifies how to use the ATT protocol to discover, read, write, and obtain information associated with these services, to facilitate use by the Bluetooth application. These services and characteristics are consistent with the services and characteristics in classic Bluetooth, and may be identified by using different UUIDs. The UUIDs corresponding to the characteristics may be UUIDs defined by the Bluetooth special interest group (SIG), or may be UUIDs defined by a device vendor. If the UUIDs defined by the device vendor are used, the client and server can identify each other only when a same UUID is used. For example, a Huawei phone uses a UUID defined by the Bluetooth special interest group to identify a heart rate detection service, and a Huawei band use a UUID defined by Huawei to identify the heart rate detection service. In this case, when receiving the UUID of the heart rate detection service sent by the Huawei band, the Huawei phone cannot match the UUID with the heart rate detection service.

When a service connection is established between the client and the server, data can be exchanged based on the characteristics. For example, the server has an electricity quantity information service, and the electricity quantity information service has a plurality of characteristics. It is assumed that a current electricity quantity of the server is 80%, and the value 80% is stored in an electricity quantity characteristic of the electricity quantity information service. The client reads the data 80% in the electricity quantity characteristic by using a UUID of the electricity quantity characteristic.

The SMP is used for Bluetooth connection security management and defines implementation of pairing and key distribution. For example, in a pairing process, the Bluetooth device needs to obtain a common key through negotiation, and then uses the key to encrypt, by using an encryption algorithm, data that is to be transmitted subsequently. Data actually transmitted by the Bluetooth device to the air is encrypted data. After receiving the data, the Bluetooth device needs to use the key obtained through negotiation to obtain correct data.

Based on a channel provided by the logical link control and adaptation protocol, the Bluetooth application 110 identifies a Bluetooth device during communication, identifies quality of service QoS, and manages any of other functions related to the host. The Bluetooth application 110 includes Bluetooth profiles, such as a hands-free profile HFP for a voice, an advanced audio distribution profile A2DP for high-quality audio stream transmission, and the like.

Figure 1B:
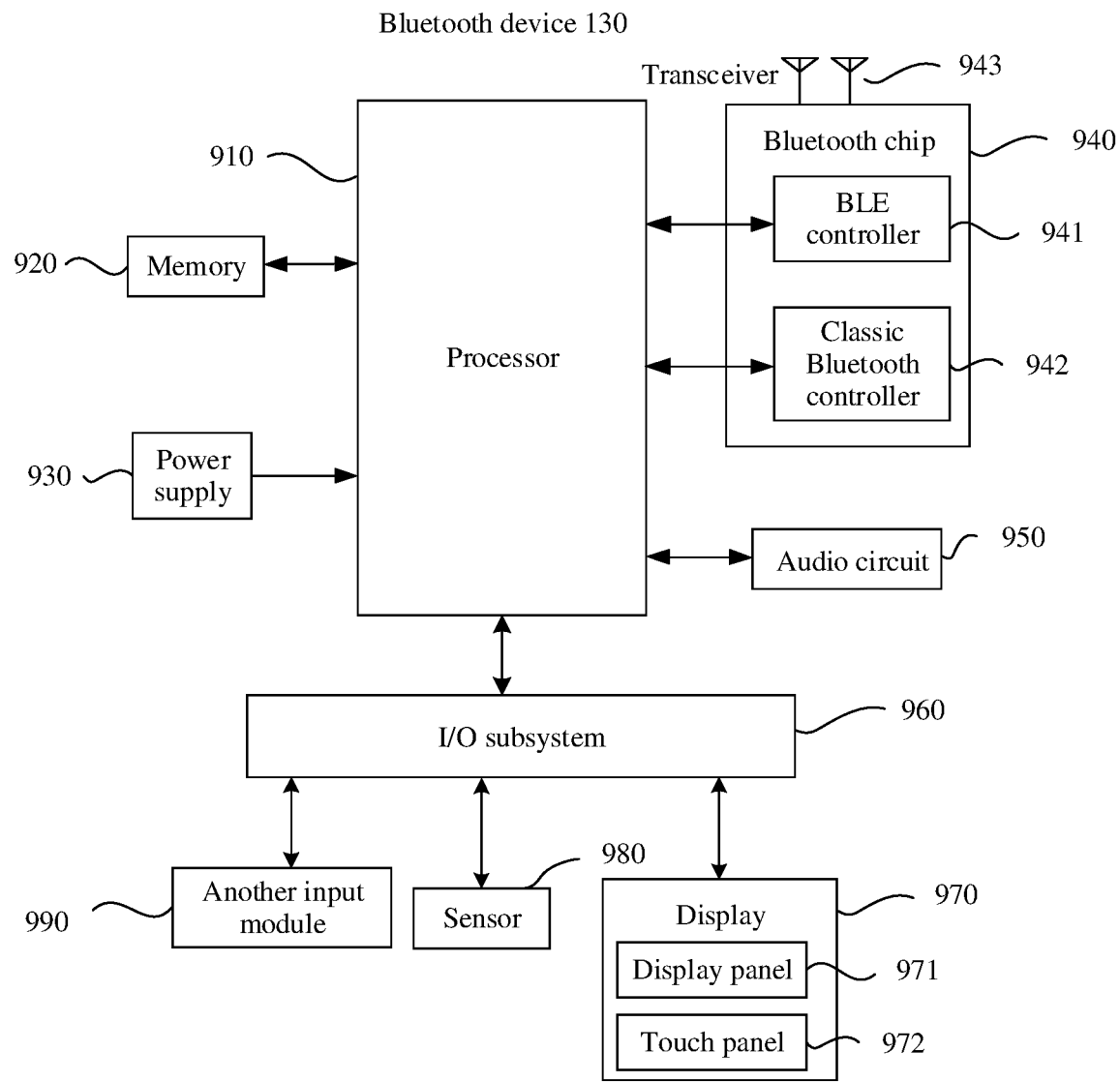
FIG. 1B shows a schematic block diagram of a Bluetooth device according to an embodiment.

FIG. 1B is a schematic block diagram of a Bluetooth device according to an embodiment. The Bluetooth device may be a first Bluetooth device or a second Bluetooth device in a Bluetooth device connection method in the embodiments.

As shown in FIG. 1B, a Bluetooth device 130 may include components such as a processor 910, a memory 920, a power supply 930, a Bluetooth chip 940, an audio circuit 950, an I/O subsystem 960, a display 970, a sensor 980, and another input device 990. A person skilled in the art may understand that the structure shown in FIG. 1B does not constitute a limitation on a structure of the Bluetooth device in this embodiment. The Bluetooth device in this embodiment may include more or fewer components than those shown in the figure, or combine some components, or split some components, or have different component arrangements.

The following describes each component of the Bluetooth device 130 with reference to FIG. 1B.

The processor 910 is a control center of the Bluetooth device 130, connects parts of an entire mobile terminal by using various interfaces and lines, and by running or executing software program and/or module stored in the memory 920, and invoking data stored in the memory 920, performs various functions of the Bluetooth device 130 and processes data, to perform overall monitoring on the mobile terminal.

Optionally, the processor 910 may include one or more processors or processing modules. Preferably, an application processor (AP) and a modem processor may be integrated in the processor 910. The AP mainly processes an operating system, a user interface, an application program, and the like. The modem processor mainly processes wireless communication. In this embodiment, the processor 910 may further include a graphics processing unit GPU. This is not limited in the embodiments. To implement the solutions, a Bluetooth module is further integrated in the processor 910, to implement related functions such as a Bluetooth connection and data transmission.

The memory 920 may be configured to store the software program and the module. The processor 910 executes various function applications of the Bluetooth device 130 and processes data by running the software program and the module stored in the memory 920. The memory 920 may mainly include a program storage area and a data storage area. The program storage area may store an operating system, an application program required by at least one function (for example, a Bluetooth control or Bluetooth connection function), and the like. The data storage area may store data (such as a ciphertext generation algorithm and a Bluetooth connection record) created based on use of the Bluetooth device 130, and the like. In addition, the memory 920 may include a high speed random access memory, and may further include a nonvolatile memory, for example, at least one magnetic disk storage device, a flash memory device, or another volatile solid-state storage device.

The power supply 930, for example, a battery, may supply power to each component. Optionally, the power supply may be logically connected to the processor 910 by using a power management system, to implement functions such as charging management, discharging management, and power consumption management by using the power management system.

The Bluetooth device 130 may further include a Bluetooth chip 940. In this embodiment, the Bluetooth chip 940 may include a BLE controller 941, a classic Bluetooth controller 942, and a transceiver 943. The BLE controller 941 and the classic Bluetooth controller 942 may implement sending and receiving of a Bluetooth radio frequency signal by controlling the transceiver 943. For example, the BLE controller 941 may control the transceiver 943 to send and receive a BLE advertising packet, and the classic Bluetooth controller 942 may control the transceiver 943 to send and receive a classic Bluetooth connection request and response, and the like. The Bluetooth device 130 may control the BLE controller 941 and the classic Bluetooth controller 942 in the Bluetooth chip 940 by using the Bluetooth module in the processor 910.

The Bluetooth chip 940 may prestore a part of data, for example, prestore a signal strength threshold of a Bluetooth signal, and an address, a ciphertext, or another identity of a connectable target Bluetooth terminal. The Bluetooth chip 940 may also independently perform some simple processing, for example, detect signal strength of a Bluetooth-related message, and/or compare the detected signal strength with the pre-stored signal strength threshold, parse the Bluetooth-related message, for example, an advertising packet, match an address, a ciphertext, or another identity in the Bluetooth-related message with the pre-stored corresponding information, and the like.

It may be understood that the BLE controller 941 and the classic Bluetooth controller 942 may be independent hardware modules, or may be merely logically independent modules, and hardware is integrated together. It may be further understood that the Bluetooth chip 940 may belong to a category of the processor 910. In addition, the Bluetooth device 130 may not have a separate Bluetooth chip. A circuit and a function related to the Bluetooth chip 940 may be integrated in the processor 910, for example, may be integrated in an AP of a mobile phone or a watch. In this case, the Bluetooth module integrates all function modules that are related to Bluetooth function implementation and that are described above.

The audio circuit 250 may include a microphone and a loudspeaker, and provide an audio interface between a user and the Bluetooth device 130. The audio circuit 950 may output audio data to the Bluetooth module or the Bluetooth chip 940, to send the audio data to another terminal, or output audio data obtained from the Bluetooth module or the Bluetooth chip 940 to the user, or the like.

The I/O subsystem 960 is configured to control an external input and output device, and may include another device input controller, a sensor controller, and a display controller.

The terminal may include the display 970. The display 970 may be configured to display information input by the user or information provided for the user and various menus of the Bluetooth device 130, and may further accept a user input. For example, the display 970 may include a display panel 971 and a touch panel 972. The display controller in the I/O subsystem 960 may receive a signal from the display 970 and/or send a signal to the display 970, to implement man-machine interaction.

The Bluetooth device 130 may further include one or more sensors 980, such as a light sensor, a motion sensor, and another sensor. The sensor controller in the I/O subsystem 960 may receive a signal from the one or more sensors 980 and/or send a signal to the one or more sensors 980.

The another input module 990 may be configured to receive input digit or character information, and generate a key signal input related to user setting and function control of the Bluetooth device 130. One or more another device input controllers receive a signal from the another input device 990 and/or send a signal to the another input device 990.

Although not shown in FIG. 1B, a radio frequency circuit may be included in the Bluetooth device 130, and is configured to receive and send a signal in an information receiving and sending process or a call process. The Bluetooth device 130 may further include a camera, a wireless fidelity (Wi-Fi or WiFi) module, an infrared module, and the like. Details are not described herein.

It should be understood that the Bluetooth device 130 in this embodiment may be a processor, or a processor with a necessary auxiliary circuit and auxiliary component, or a chip or a chip group including a plurality of chips, or the like.

Figure 1C:
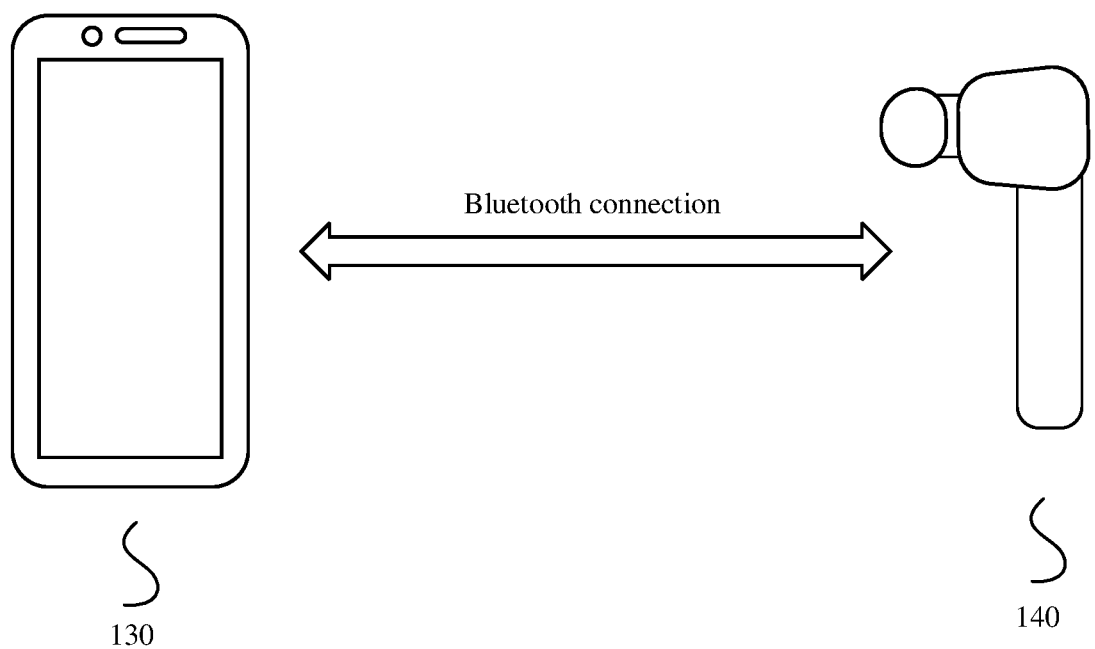
FIG. 1C shows a connection manner of a Bluetooth device according to an embodiment.

FIG. 1C shows a connection manner of a Bluetooth device according to an embodiment. For example, a Bluetooth device 130 may be a master device, and a Bluetooth device 140 may be a slave device. The Bluetooth device 140 provides a service for the master device 130 through Bluetooth connection, for example, the Bluetooth device 140 may provide services such as answering a call and playing audio. The Bluetooth device 130 and the Bluetooth device 140 exchange data according to a known Bluetooth communication standard. It should be understood that the master device and the slave device in the embodiments are merely an example, and any device having a Bluetooth function may use the solutions provided in the embodiments.

Figure 1D:
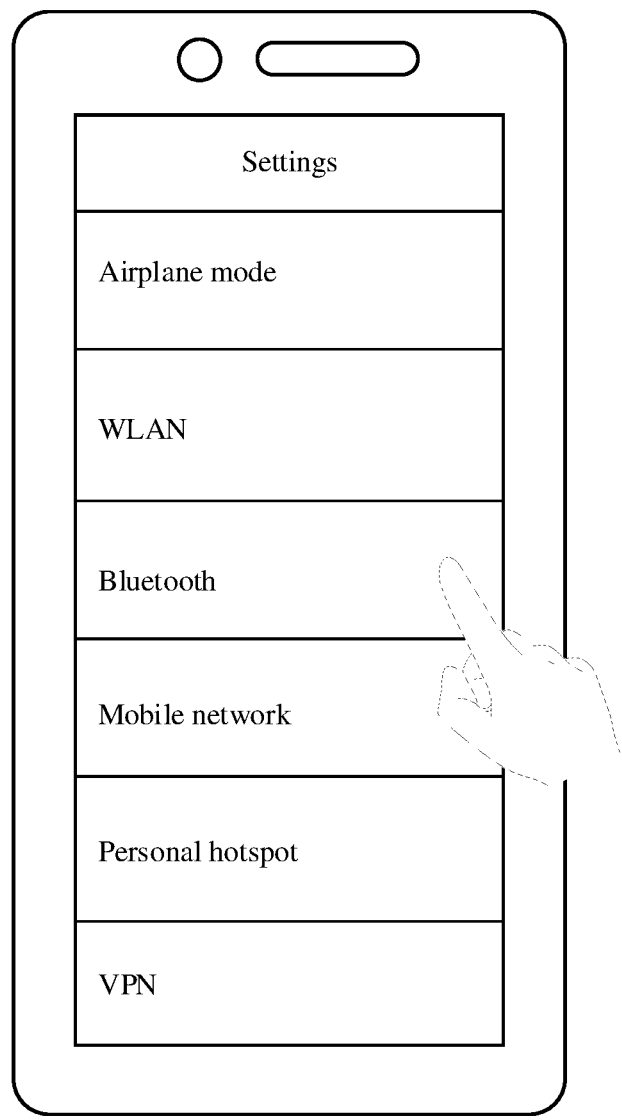
FIG. 1D to FIG. 1F show a Bluetooth connection process according to an embodiment.
Figure 1E:
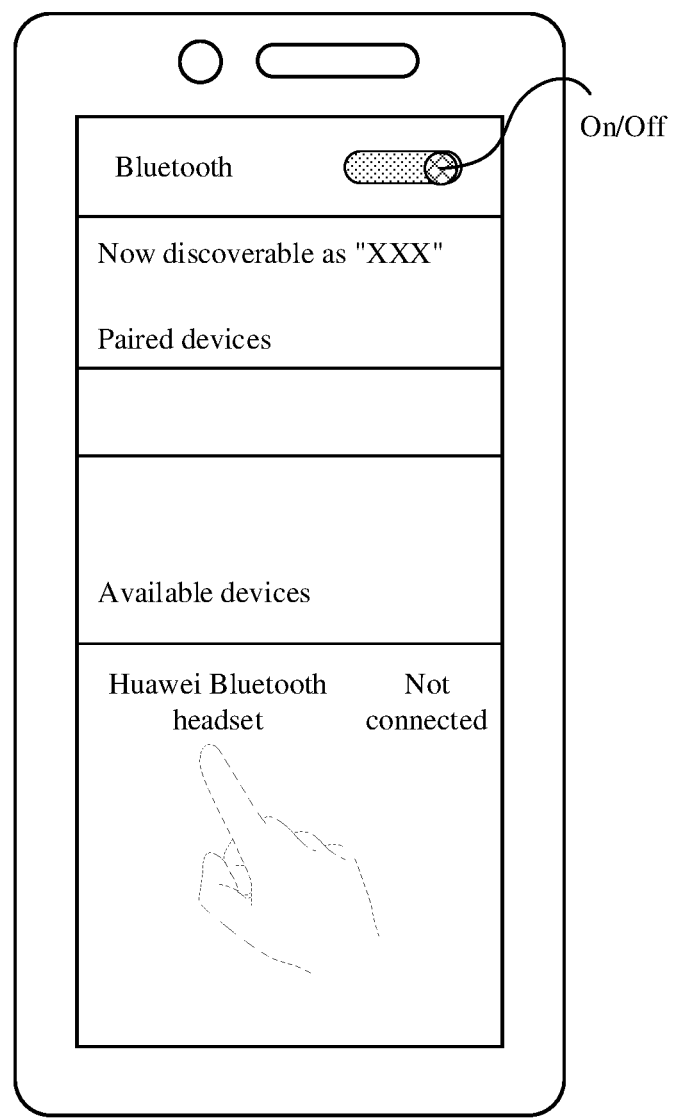
Figure 1F:
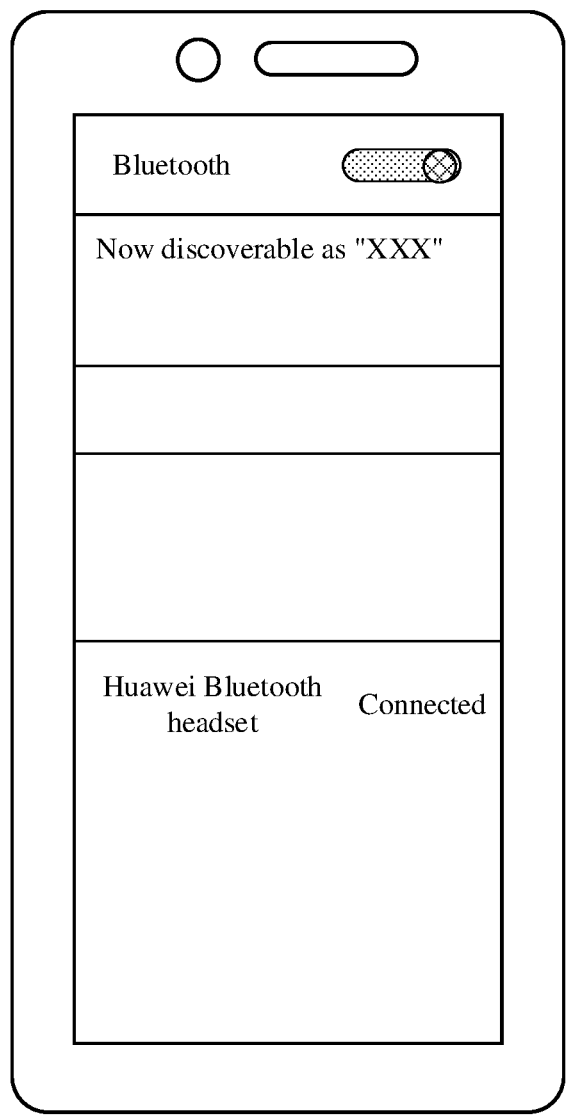

FIG. 1D to FIG. 1F show a Bluetooth connection process. For example, a Bluetooth device 130 may be a smartphone. As shown in FIG. 1D, the Bluetooth device 130 displays a settings screen, and the settings screen includes functions such as "airplane mode", "WLAN", "Bluetooth", and "mobile network". The user taps the Bluetooth function, to enter a Bluetooth function screen shown in FIG. 1E. As shown in FIG. 1E, the Bluetooth function screen includes "on/off", "paired devices", and "available devices". When a user drags an on/off icon to turn on the Bluetooth function, the Bluetooth device 130 turns on the Bluetooth function, and then can discover a surrounding connectable Bluetooth device. For example, as shown in FIG. 1E, after the Bluetooth device 130 turns on the Bluetooth function, the Bluetooth device 130 starts to scan for surrounding available slave devices, and then displays the scanned available slave devices on a screen shown in FIG. 1E. For example, a Huawei Bluetooth headset icon is displayed below the "available devices", and in this case, a Huawei Bluetooth headset is not connected. As shown in FIG. 1E, when the user taps the Huawei Bluetooth headset icon, the Bluetooth device 130 establishes a Bluetooth connection to the Huawei Bluetooth headset. When the connection is established, the Bluetooth device 130 displays a screen shown in FIG. 1F. In this case, a Bluetooth connection is established between the Huawei Bluetooth headset and the Bluetooth device.

Figure 2:
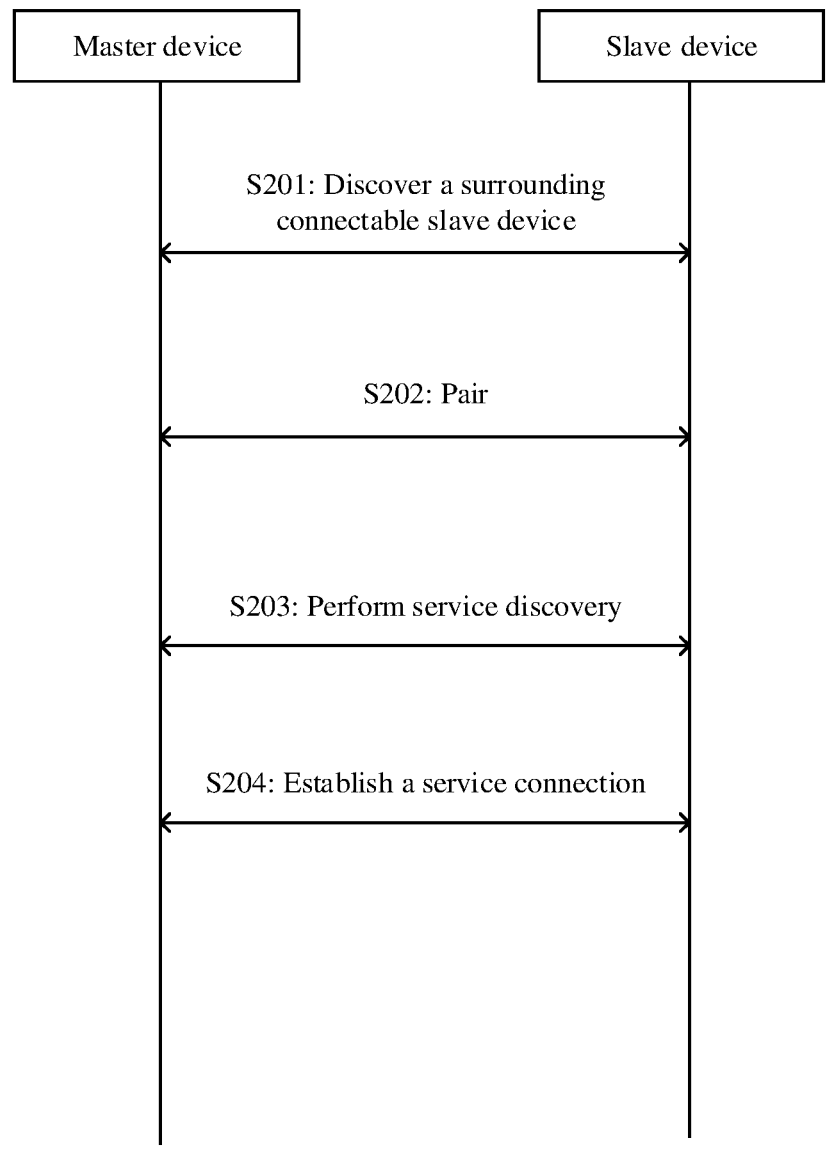
FIG. 2 shows an existing Bluetooth connection manner.

FIG. 2 shows an existing Bluetooth connection manner. The Bluetooth connection manner is applicable to a classic Bluetooth connection and a Bluetooth low energy connection. It should be understood that, for ease of description, the Bluetooth connection manner shown in FIG. 2 does not show all steps of the Bluetooth connection, and each step shown in FIG. 2 may further include one or more steps.

Steps as follows:

S201: Discover a surrounding connectable slave device.

After a master device and the slave device both turn on a Bluetooth function, the master device receives information from the slave device, and discovers the surrounding connectable slave device. In other words, in this step, the master device searches for a surrounding available Bluetooth device. For example, the master device is a mobile phone. As shown in FIG. 1E, after a user drags the on/off icon to turn on the Bluetooth function, the mobile phone turns on the Bluetooth function. In some embodiments, after turning on the Bluetooth function, the mobile phone shown in FIG. 1E receives advertising data of a Huawei Bluetooth headset, and then displays name information included in the advertising data. For example, the name information included in the advertising data may be Huawei Bluetooth headset. In this time, the mobile phone discovers the Huawei Bluetooth headset.

S202: Pair.

After the master device discovers the slave device, the master device needs to pair with one slave device according to a user selection or a preset rule. There are mainly four pairing manners based on the Bluetooth technology: Numeric Comparison, PassKey Entry, Just Work, and out-of-band (OOB). The Numeric Comparison indicates that both paired parties display a number, for example, having six digits, and a user checks whether the numbers are consistent. The Just Work is a simple pairing manner specified by the Bluetooth standard protocol. In this manner, pairing can be completed between Bluetooth devices without user intervention, and this manner is applicable to a case in which a slave device does not have a display function. For example, a Bluetooth headset does not have a display, and may use the Just Work pairing manner. The PassKey Entry indicates that a number (for example, having six digits) displayed on the master device needs to be inputted on the slave device. If the inputted number is correct, the slave device can be paired with the master device. The OOB indicates that the master device and the secondary device exchange pairing information in a non-Bluetooth connection manner, for example, NFC.

The pairing process may include establishing an asynchronous connection-oriented logical link ACL connection, pairing characteristic exchange, key generation, and key distribution. The master device and the slave device may exchange data by using the ACL connection. The pairing characteristic exchange indicates that the master device and the slave device notify each other of a pairing function supported by the master device and the slave device. For example, when the slave device is a Bluetooth headset, the PassKey Entry pairing manner cannot be supported. The key generation and the key distribution indicate that the two parties negotiate an encryption mode and share a key.

For example, as shown in FIG. 1E, after the user taps the Huawei Bluetooth headset icon, the mobile phone is paired with the Huawei Bluetooth headset, and the user does not need to perform a further operation. In this case, the Huawei Bluetooth headset stops advertising outside. When the Huawei Bluetooth headset performs pairing with the mobile phone, another Bluetooth device cannot discover the Huawei Bluetooth headset.

S203: Perform service discovery.

After the master device and the slave device are paired with each other, a service discovery process needs to be performed. The service discovery process indicates that the master device discovers a service supported by the slave device. In the foregoing steps, only a secure data exchange channel is established between the master device and the slave device. In this case, the master device does not know a service provided by the slave device, and the master device needs to further know the service provided by the slave device, to establish a corresponding service connection. As described above, a service includes one or more characteristics, and each characteristic corresponds to a UUID. The master device may discover, by using the UUID, the service provided by the secondary device, and exchange data.

S204: Establish a service connection.

After the service discovery process is completed, the master device knows the service provided by the slave device, and may select a corresponding service according to an instruction of the user or an application, to establish a service connection. Establishing a heart rate detection service connection is used as an example, where the master device is a mobile phone, and the secondary device is a band. After the service discovery process is completed, a heart rate detection service connection is established between the mobile phone and the band. The mobile phone sends read information to the band, where the read information includes a UUID of the heart rate service. After receiving the read information, the band discovers heart rate service data based on the UUID of the heart rate service, and then sends read response information to the mobile phone, where the read response information includes the heart rate service data.

In an existing Bluetooth connection manner, both the classic Bluetooth and the Bluetooth low energy need the service discovery process in a connection process, and the master device and the slave device both need to perform a plurality of interactions in the service discovery process. As a result, the service discovery process is time-consuming, and problems are easy to occur due to a large quantity of interaction processes. Therefore, in this embodiment, the slave device may simultaneously send the UUID information of the service to the master device in step S201, so that the service discovery process in S203 is avoided.

Figure 3:
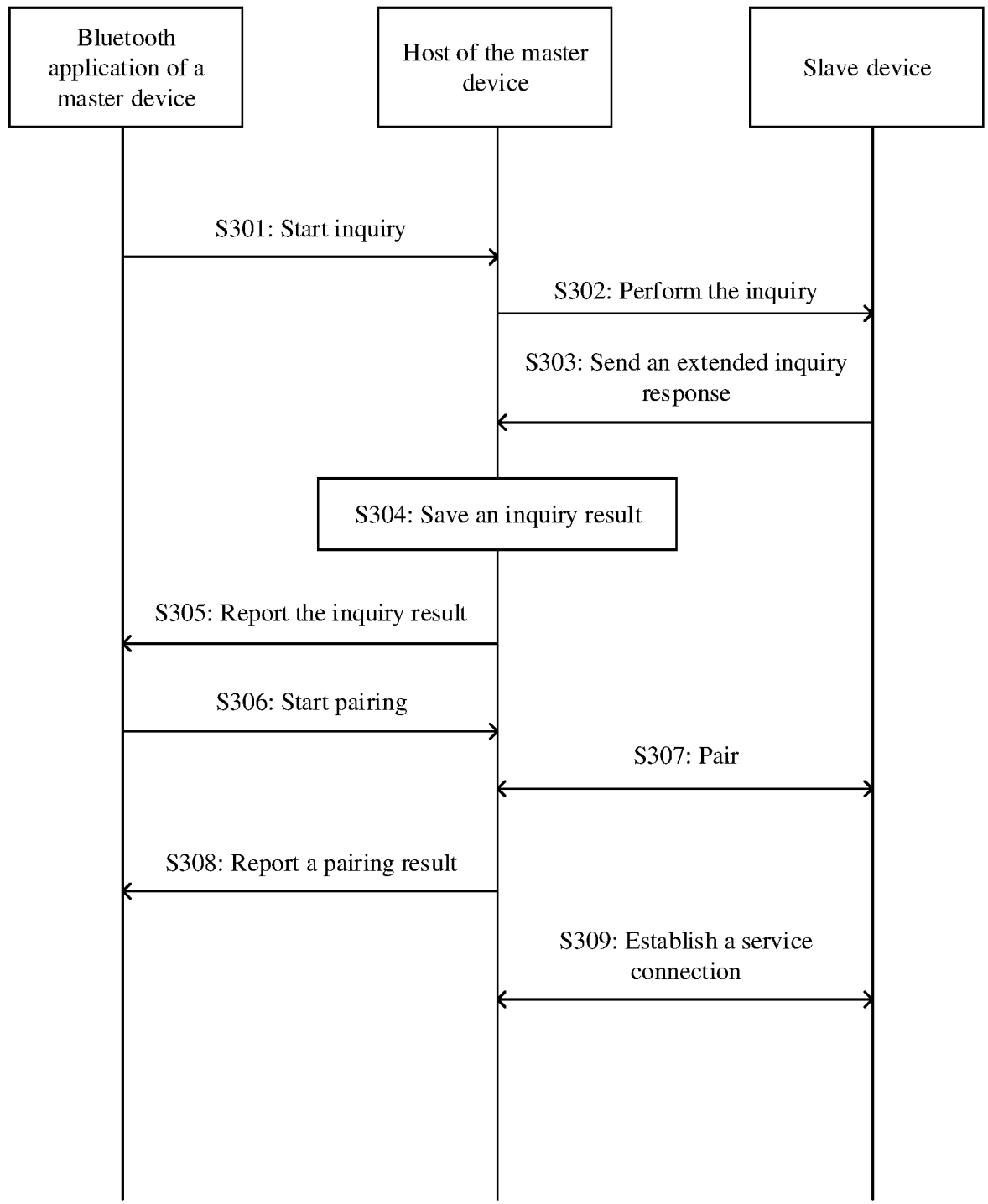
FIG. 3 shows a Bluetooth connection manner according to an embodiment.

FIG. 3 shows a Bluetooth connection manner according to an embodiment. The Bluetooth connection manner is based on a classic Bluetooth connection. It should be understood that the Bluetooth connection manner shown in this embodiment does not show all steps of the Bluetooth connection, and each step shown in FIG. 3 may further include one or more steps.

S301: Start inquiry.

A Bluetooth application of a master device instructs a host of the master device to start inquiry, to inquire about a nearby connectable Bluetooth device. For example, when a user wants to search for a Bluetooth headset by using a mobile phone, the user may drag the Bluetooth on/off icon on the screen shown in FIG. 1E, to trigger to send an inquiry start command to the Bluetooth application. The Bluetooth application sends an inquiry instruction to the host according to the command, and the master device starts to inquire about a surrounding connectable Bluetooth device.

S302: Perform the inquiry.

The host of the master device starts an inquiry scan according to the instruction of the Bluetooth application of the master device. A main body of the master device sends an inquiry message at a specific interval, so that the surrounding connectable slave device can receive the inquiry message sent by the master device. The inquiry message may be an inquiry access code, where the inquiry access code may be further classified into a general inquiry access code (GIAC) and a dedicated inquiry access code (DIAC). The general inquiry access code is used to inquire about all connectable Bluetooth devices, and the dedicated inquiry access code is used to inquire about a dedicated type of Bluetooth device.

It should be noted that after receiving inquiry response information sent by the slave device, the host of the master device does not stop sending the inquiry information. The host of the master device stops sending the inquiry information only when receiving a pairing start instruction sent by the Bluetooth application of the master device.

S303: Send an extended inquiry response.

The slave device changes monitoring frequency at a specified interval in a connectable state. After receiving a GIAC or a DIAC, the slave device sends a frequency hopping sequence FHS. The frequency hopping sequence FHS may include a device address and clock information, to help the slave device exchange data with the master device. In order to reduce a quantity of interactions and shorten interaction time, the slave device sends an extended inquiry response message (EIR), to transmit specified data. For example, the EIR information may include information such as a name of the slave device, a UUID of a service, and manufacturer data. In this way, after receiving the EIR information sent by the slave device, the master device does not need to send request information to the slave device again to request the slave device to send information such as the name of the slave device. It should be noted that, as long as receiving the inquiry message sent by the master device, all connectable slave devices surrounding the master device may send EIR information to the master device when an inquiry message standard condition is met. Therefore, the master device may receive EIR information sent by at least one slave device.

In this embodiment, after receiving the GIAC or the DIAC, the slave device sends the EIR information, where the EIR information may include UUID information of a service provided by the slave device. For example, the master device is a mobile phone, and the slave device is a Bluetooth headset. The Bluetooth headset may add UUID information of a Bluetooth audio transmission service A2DP or a Bluetooth hands-free service HFP to the EIR information. After receiving EIR information sent by the Bluetooth headset, a host of the mobile phone parses the received information according to the Bluetooth protocol stack, to obtain a name of the Bluetooth headset and the UUID information of the service supported by the Bluetooth headset, and then reports the UUID information of the service supported by the Bluetooth headset to the Bluetooth application of the mobile phone in a subsequent step. In this way, the mobile phone may know, by using the EIR information sent by the Bluetooth headset, that the Bluetooth headset supports the Bluetooth audio transmission service and the Bluetooth hands-free service, and know, without a service discovery process, the service that can be provided by the Bluetooth headset.

S304: Save an inquiry result.

After obtaining the UUID information of the service provided by the slave device, the host of the master device stores the UUID information in a memory of the master device. The memory may be a read-only memory (ROM) or a random access memory (RAM) memory. In the conventional technology, in this step, the master device does not parse or store the UUID of the service of the secondary device. However, in this embodiment, after obtaining the EIR information of the slave device, the master device parses slave device service information included in the EIR information and stores the slave device service information in the memory of the master device. The host of the master device may report the slave device service information to the Bluetooth application of the master device in a subsequent step.

S305: Report the inquiry result.

After obtaining the UUID information of the service of the slave device through the EIR information, the host of the master device may report the UUID information to the master device application in this step. The UUID information of the service may include the UUID information of the HFP and the A2DP.

For example, the host of the master device obtains, through inquiry, UUID information of services provided by 10 slave devices, and when reporting the inquiry result, the UUID information of the services provided by the 10 slave devices are reported to the Bluetooth application of the master device.

It should be noted that, after reporting the inquiry result, the host of the master device does not stop sending the inquiry information. If the EIR information sent by the slave device is received, step S304 and step S305 are repeatedly performed.

S306: Start pairing.

The Bluetooth application of the master device instructs the host of the master device to initiate pairing with one slave device. For example, the user selects one of connectable slave devices provided on a display of the master device to perform pairing. The Bluetooth application of the master device receives an instruction sent by the user, to instruct the host of the master device to initiate pairing to the slave device selected by the user.

S307: Pair.

After receiving a pairing instruction sent by the Bluetooth application of the master device, the host of the master device stops sending the inquiry message, and may establish an asynchronous connection-oriented logical link ACL connection to the slave device. For a pairing manner, refer to the pairing step S202 shown in FIG. 2.

S308: Report a pairing result.

After the pairing succeeds, the host of the master device reports a pairing result to the Bluetooth application of the master device.

In some embodiments, if the host of the master device does not report the UUID information of the service of the slave device to the Bluetooth application of the master device in the inquiry result reporting step S305, the host of the master device may also report the UUID information that is of the service of the paired slave device and that is stored in the memory of the master device to the Bluetooth application of the master device in step S308.

An advantage of reporting the UUID information of the service of the slave device in step S308 is that the host of the master device only needs to report a UUID of a service of a slave device that is paired with the host of the master device. However, if the host of the master device reports the UUID of the service of the slave device in step S305, the host of the master device needs to report UUID information of services of all slave devices that are discovered by the master device. For example, the master device is a mobile phone. After the mobile phone turns on a Bluetooth function, a Bluetooth host of the mobile phone receives, through inquiry, EIR information sent by each of 20 Bluetooth devices, where the EIR information includes UUID information of a service supported by a Bluetooth device that sends the information. Due to a limitation of the Bluetooth technology, the mobile phone usually selects one of the 20 Bluetooth devices for pairing, and then establishes a service connection. Therefore, the Bluetooth application needs to obtain only UUID information of a service provided by a paired Bluetooth device. Therefore, in step S308, when the UUID of the service provided by the slave device is reported, the Bluetooth host needs to report UUID information of all services provided by only one Bluetooth device to the Bluetooth application.

S309: Establish a service connection.

After the Bluetooth application of the master device receives the pairing result, based on the previously received UUID information of the services of the slave device, the master device may select one service to directly establish a service connection to the slave device, and transmit data to the slave device without the service discovery process. In some embodiments, after the slave device receives data transmitted by the master device and processes the data based on the existing technology, the data may be played by a loudspeaker and transmitted to a user.

As described above, power consumption of the Bluetooth low energy is $\frac{1}{10}$ or less of that of the classic Bluetooth, and the Bluetooth low energy technology may be used to greatly prolong continuous use time of a Bluetooth device. For example, most Bluetooth headsets that use the classic Bluetooth technology to transmit audio information need to be charged after working for less than three hours. If using the Bluetooth low energy technology to transmit audio, the Bluetooth headset can continuously work for one day or even longer. However, in the conventional technology, the service discovery process also exists in a connection process of the Bluetooth low energy technology, which not only increases power consumption of a Bluetooth device, but also prolongs connection time. Consequently, user experience is severely affected. The solutions in the embodiments can effectively reduce the power consumption of a Bluetooth low energy connection.

Figure 4:
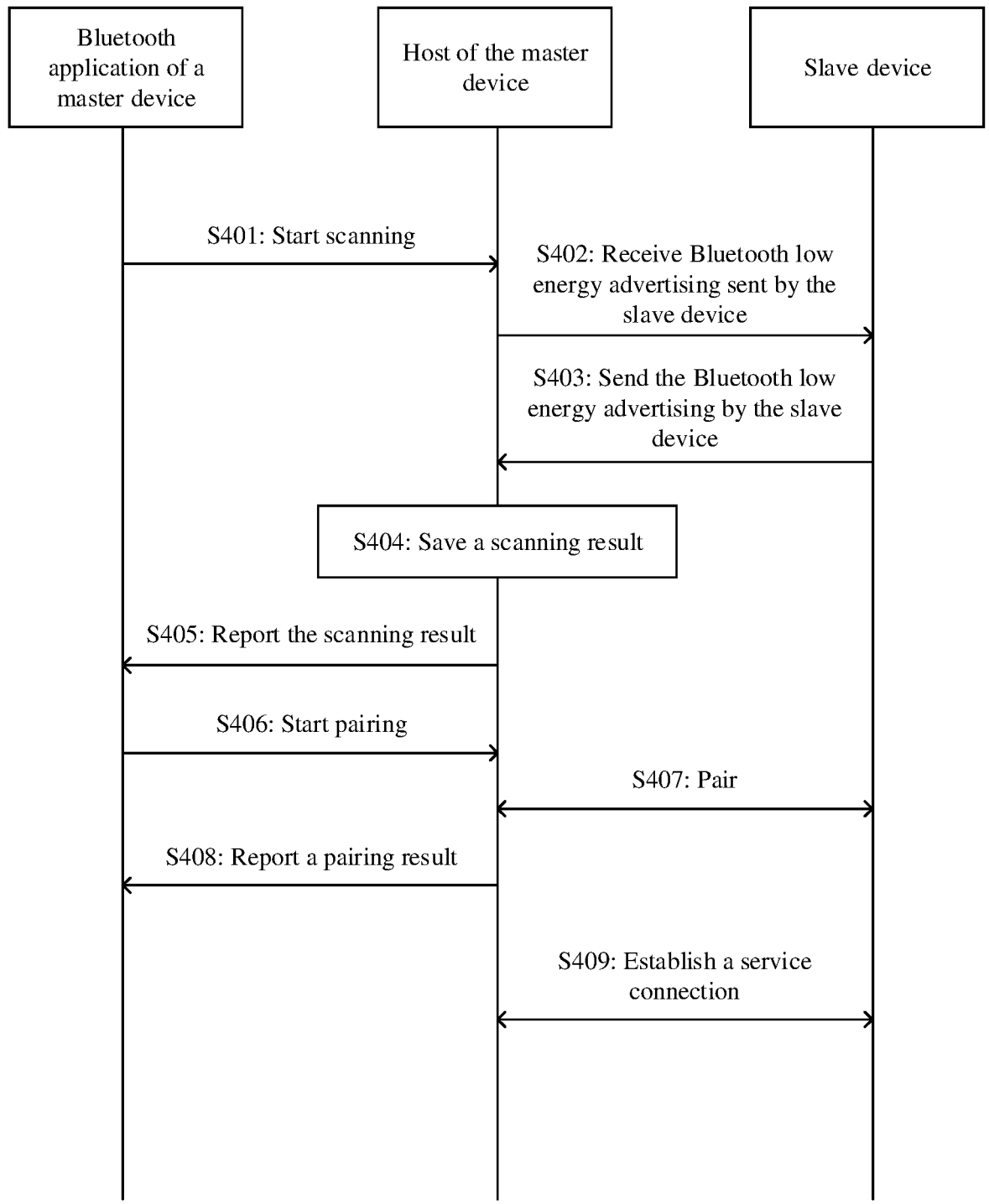
FIG. 4 shows another Bluetooth connection manner according to an embodimention.

FIG. 4 shows a connection manner based on the Bluetooth low energy technology according to an embodiment.

As shown in FIG. 4, connection steps are as follows:

S401: Start scanning

This step is optional. If a Bluetooth function of a master device is in an off state, the Bluetooth function of the master device first needs to be turned on. After the Bluetooth function is turned on, a Bluetooth application of the master device indicates a host of the master device to start scanning For example, the master device is a mobile phone. When a user wants to search for a Bluetooth headset by using the mobile phone, the user may drag the Bluetooth on/off icon on the screen shown in FIG. 1E, to trigger to send a scanning start command to a Bluetooth application. The Bluetooth application sends a scanning instruction to the host according to the command, and the master device starts to receive Bluetooth low energy advertising (Advertising Data, AD) sent by a surrounding connectable Bluetooth device.

S402: Receive Bluetooth low energy advertising sent by a slave device.

The Bluetooth low energy (BLE) defines two types of channels: three advertising channels and 37 data channels. The Bluetooth devices may select, according to requirements, to receive information on different channels. After receiving the scanning start command of the Bluetooth application of the master device, the host of the master device starts to receive the Bluetooth low energy advertising of the slave device on at least one of the three advertising channels. To further obtain data of the slave device, the master device may send active scan request information SCAN_REQ.

S403: Send the Bluetooth low energy advertising by the slave device.

If the slave device is in a connectable state, the slave device may use at least one of the three advertising channels to send the Bluetooth low energy advertising. In this case, if the master device receives the Bluetooth low energy advertising sent by the slave device, the master device may discover the slave device. In some embodiments, the master device may further send active scan request information, to request the slave device to send attachment information such as device information. After receiving the active scan request information of the master device, the slave device sends active scan response information.

For example, the master device is a mobile phone, and the slave device is a Bluetooth headset. After a Bluetooth low energy function is turned on, the Bluetooth headset sends Bluetooth low energy advertising on three advertising channels, where the Bluetooth low energy advertising includes a name of the Bluetooth headset. In this way, after receiving the Bluetooth low energy advertising sent by the Bluetooth headset, a host of the mobile phone parses the received information according to the Bluetooth protocol stack to obtain the name of the Bluetooth headset, and then reports the name of the Bluetooth headset to a Bluetooth application of the mobile phone.

In this embodiment, the slave device may randomly select one or more of the foregoing advertising channels to send the Bluetooth low energy advertising. In the conventional technology, the Bluetooth low energy advertising does not include UUID of a service provided by the slave device. The master device needs to obtain, by using a specified service discovery process, a function that can be supported by the slave device. However, in this embodiment, the slave device may carry the UUID of the service in one of the following fields in a sent Bluetooth low energy advertising data field: a reserved field, an idle field or an extensible field in another field, a customized field reserved in a vendor field, or the like, for example, UUIDs of an HFP and an A2DP. In this way, the service discovery process can be omitted, connection power consumption can be reduced, and connection time can be shortened.

In some embodiments, the UUID of the service included in the Bluetooth low energy advertising sent by the slave device may be customized by a device manufacturer. If the master device also includes the customized UUID of the service, after the master device receives the Bluetooth low energy advertising of the slave device, the master device may stop scanning, and directly establish a service connection to the slave device according to pre-stored information about the slave device, to transmit data. An advantage of this method lies in that scanning time and pairing time of the master device can be reduced, to further shorten Bluetooth connection time.

For steps S404, S405, S406, S407, S408, and S409, refer to steps S304, S305, S306, S307, S308, and S409 shown in FIG. 3. Details are not described herein again.

In some embodiments, the master device and the slave device shown in FIG. 4 use a Just Work pairing manner.

In the embodiment shown in FIG. 4, the slave device adds the UUID of the supported service to Bluetooth low energy advertising, so that the master device can obtain data for establishing a GATT connection when receiving information such as a location and a name of the slave device. After obtaining the UUID of the service of the slave device, the master device stores the UUID in a memory. The host of the master device reports the UUID to the Bluetooth application of the master device in the scanning result or pairing result reporting step.

Figure 5:
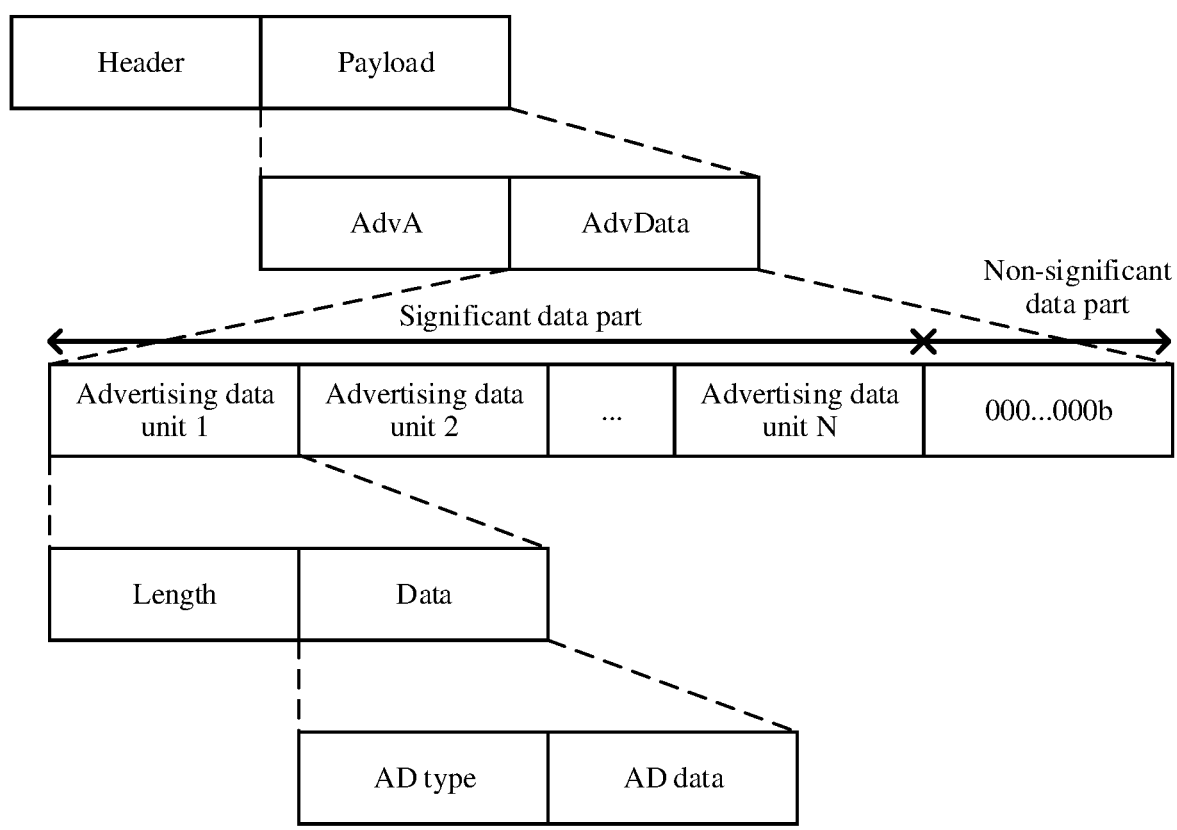
FIG. 5 shows a Bluetooth low energy advertising structure according to an embodiment.

The following describes a Bluetooth low energy advertising structure according to an embodiment with reference to FIG. 5. The Bluetooth low energy advertising structure includes a header and a payload, where the payload includes AdvA and AdvData, and the AdvA is an advertising address of a slave device.

The AdvData includes 31 bytes, including a significant data part (significant) and a non-significant data part (non-significant). The significant data part includes several advertising data structures (AD Structure).

Each AD structure includes length and data parts. The length part indicates a data length. The data part includes an AD type and AD data. The AD type is used to indicate a type of the AD data. The AD type may include a connection function (Flags), a slave device name (Local Name), customized data, and the like.

In this embodiment, the UUID of the service of the slave device may be added to the AD structure, or the UUID of the service of the slave device may be added to any field of the advertising data. This is not limited in this embodiment.

In this embodiment, the advertising data sent by the slave device may be a directed connection indication ADV_DIRECT_IND, a universal advertising indication ADV_IND, a scanable universal advertising indication ADV_SCAN_IND, and a connectionless advertising indication ADV_NONCONN_IND. The ADV data includes an advertising data AD (Advertising Data) structure.

An embodiment provides a Bluetooth device. For example, the Bluetooth device may be a smart mobile terminal. The Bluetooth device may include a Bluetooth module and a memory. Solutions in the embodiments corresponding to FIG. 3 to FIG. 5 and their extended embodiments may be implemented in this Bluetooth device. For example, the Bluetooth module is configured to communicate with another Bluetooth device, and includes a Bluetooth host and a Bluetooth application. The Bluetooth module further includes one or more processors. The Bluetooth host and the Bluetooth application may run on a same processor, or may run on different processors. This is not limited in this embodiment. The memory includes instructions, and when the instructions are executed by the foregoing processor, the foregoing Bluetooth device is enabled to perform the following operations:

searching for an available Bluetooth device; receiving advertising information sent by the available Bluetooth device, where the available Bluetooth device includes a first Bluetooth device, and advertising information of the first Bluetooth device includes UUID information of a service supported by the first Bluetooth device; storing and parsing the UUID information that is of the service supported by the first Bluetooth device and that is included in the advertising information of the first Bluetooth device; instructing the Bluetooth host to pair with the first Bluetooth device; instructing the Bluetooth host to report pairing information to the Bluetooth application, where the pairing information includes the UUID information of the service supported by the first Bluetooth device; and establishing a service connection to the first Bluetooth device based on the UUID information of the service supported by the first Bluetooth device.

An embodiment further provides another Bluetooth device. For example, the Bluetooth device may be a Bluetooth headset, a Bluetooth watch, a Bluetooth band, or the like. The Bluetooth device includes a Bluetooth module and a memory. Solutions in the embodiments corresponding to FIG. 3 to FIG. 5 and their extended embodiments may be implemented in this Bluetooth device. For example, the Bluetooth module is configured to communicate with another Bluetooth device, and further includes one or more processors. The memory includes instructions, and when the instructions are executed by the foregoing processor, the foregoing Bluetooth device is enabled to perform the following operations:

sending advertising information, where the advertising information includes UUID information of a service supported by the electronic device; receiving a pairing request of a first Bluetooth device; pairing with the first Bluetooth device in response to the pairing request of the first Bluetooth device; receiving a service connection request of the first Bluetooth device, where the service connection request of the first Bluetooth device includes a part or all of the UUID information of the service supported by the Bluetooth device; and establishing a service connection to the first Bluetooth device in response to the service connection request of the first Bluetooth device.

An embodiment further provides a system, including a first Bluetooth device and a second Bluetooth device, where the second Bluetooth device includes a second Bluetooth application and a second Bluetooth host. The first Bluetooth device is configured to send advertising information, and the advertising information includes UUID information of a service supported by the first Bluetooth device. In some embodiments, the advertising information is Bluetooth low energy advertising. In some other embodiments, the advertising information is extended inquiry response information. The second Bluetooth host is configured to perform the following operations: searching for an available Bluetooth device, and receiving advertising information sent by the available Bluetooth device, where the available Bluetooth device includes the first Bluetooth device, and advertising information of the first Bluetooth device includes the UUID information of the service supported by the first Bluetooth device; storing and parsing the UUID information that is of the service supported by the first Bluetooth device and that is included in the advertising information of the first Bluetooth device; and sending a pairing request to the first Bluetooth device. It should be noted that the searching for an available Bluetooth device may be performed in different manners according to different situations. For example, in a classic Bluetooth connection manner, the second Bluetooth host actively sends inquiry information when searching for an available Bluetooth device, and after receiving the inquiry information sent by the second Bluetooth host, a surrounding available Bluetooth device sends inquiry response information or extended inquiry response information to the second Bluetooth host. In a Bluetooth low energy connection manner, the second Bluetooth host searches a Bluetooth low energy advertising channel for Bluetooth low energy advertising sent by a surrounding available Bluetooth device.

The first Bluetooth device is further configured to perform the following operations: receiving a pairing request of the second Bluetooth device; and pairing with the second Bluetooth device in response to the pairing request of the second Bluetooth device. It should be noted that there may be a plurality of interactions in a process of pairing the first Bluetooth device with the second Bluetooth device.

The second Bluetooth device is further configured to perform the following operations: instructing the second Bluetooth host to report pairing information to the second Bluetooth application, where the pairing information includes the UUID information of the service supported by the first Bluetooth device; and sending a service connection request to the first Bluetooth device based on the UUID information of the service supported by the first Bluetooth device. The first Bluetooth device is further configured to perform the following operations: receiving the service connection request of the second Bluetooth device; and establishing a service connection to the second Bluetooth device in response to receiving the service connection request of the second Bluetooth device.

An embodiment provides a Bluetooth chip. The solutions in the embodiments corresponding to FIG. 3 to FIG. 5 and their extended embodiments may be implemented in this Bluetooth device. For example, the Bluetooth chip includes a memory, configured to store a program; and a processor, configured to execute the program stored in the memory. The program may implement functions of a Bluetooth host and a Bluetooth application, so that the Bluetooth chip performs the following operations: searching for an available Bluetooth device; receiving broadcast information sent by the available Bluetooth device, where the available Bluetooth device includes a first Bluetooth device, and broadcast information of the first Bluetooth device includes UUID information of a service supported by the first Bluetooth device; storing and parsing the UUID information that is of the service supported by the first Bluetooth device and that is included in the broadcast information of the first Bluetooth device; instructing the Bluetooth host to perform a pairing operation with the first Bluetooth device; instructing the Bluetooth host to report pairing information to the Bluetooth application of the electronic device, where the pairing information includes the UUID information of the service supported by the first Bluetooth device; and establishing a service connection to the first Bluetooth device based on the UUID information of the service supported by the first Bluetooth device.

An embodiment further provides another Bluetooth chip. The solutions in the embodiments corresponding to FIG. 3 to FIG. 5 and their extended embodiments may be implemented in this Bluetooth device. For example, the Bluetooth chip includes a memory, configured to store a program; and a processor, configured to execute the program stored in the memory, so that the Bluetooth chip performs the following operations: sending broadcast information, where the broadcast information includes UUID information of a service supported by the electronic device; receiving a pairing request of a first Bluetooth device; establishing pairing with the first Bluetooth device in response to the pairing request of the first Bluetooth device; receiving a service connection request of the first Bluetooth device, where the service connection request of the first Bluetooth device includes a part or all of the UUID information of the service supported by the Bluetooth device; and establishing a service connection to the first Bluetooth device in response to the service connection request of the first Bluetooth device.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and related constraint conditions of the solutions. A person of ordinary skill in the art may use different methods to implement the described functions for each particular application, but it should not be considered that the implementation goes beyond the scope of the embodiments.

It may be clearly understood by a person of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the solutions essentially, or the part contributing to the conventional technology, or some of the solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of the embodiments, but are non-limiting.

What is claimed is:

1. A Bluetooth device, comprising:
   a Bluetooth module, configured to communicate with another Bluetooth device, wherein the Bluetooth module comprises a Bluetooth host and a Bluetooth application; and
   the Bluetooth module further comprises one or more processors; and
   a memory, wherein the memory comprises instructions, and when the instructions are executed by the one or more processors, the Bluetooth device is enabled to perform the following operations:
   searching for an available Bluetooth device;
   receiving advertising information sent by the available Bluetooth device, wherein the available Bluetooth device comprises a first Bluetooth device, and advertising information of the first Bluetooth device comprises universal unique identifier (UUID information of a service supported by the first Bluetooth device;
   storing and parsing the UUID information that is of the service supported by the first Bluetooth device and that is comprised in the advertising information of the first Bluetooth device;
   instructing the Bluetooth host to pair with the first Bluetooth device;
   instructing the Bluetooth host to report pairing information to the Bluetooth application, wherein the pairing information comprises the UUID information of the service supported by the first Bluetooth device; and
   in response to pairing with the first Bluetooth device, establishing a service connection to the first Bluetooth device based on the UUID information of the service supported by the first Bluetooth device.

2. The Bluetooth device according to claim 1, wherein the advertising information is Bluetooth low energy advertising.

3. The Bluetooth device according to claim 1, wherein the advertising information is extended inquiry response information.

4. The Bluetooth device according to claim 1, wherein the UUID information of the service supported by the first Bluetooth device comprises UUID information of a voice hands-free profile (HFP) and an advanced audio distribution profile (A2DP).

5. A Bluetooth device, comprising:
   a Bluetooth module, configured to communicate with another Bluetooth device, wherein
   the Bluetooth module further comprises one or more processors; and
   a memory, comprising instructions, wherein when the instructions are executed by the one or more processors, the Bluetooth device is enabled to perform the following operations:
   sending advertising information, wherein the advertising information comprises universal unique identifier (UUID) information of a service supported by the Bluetooth device;
   receiving a pairing request of a first Bluetooth device;

pairing with the first Bluetooth device in response to the pairing request of the first Bluetooth device;

in response to pairing with the first Bluetooth device, receiving a service connection request of the first Bluetooth device, wherein the service connection request of the first Bluetooth device comprises a part or all of the UUID information of the service supported by the Bluetooth device; and establishing a service connection to the first Bluetooth device in response to the service connection request of the first Bluetooth device.

6. The Bluetooth device according to claim 5, wherein the advertising information is Bluetooth low energy advertising.

7. Bluetooth device according to claim 5, wherein the advertising information is extended inquiry response information.

8. The Bluetooth device according to claim 5, wherein the UUID information of the service supported by the electronic device comprises UUID information of a voice hands-free profile (HFP) and an advanced audio distribution profile (A2DP).

9. A Bluetooth communication method applied to a Bluetooth device, wherein the Bluetooth device comprises a Bluetooth host and a Bluetooth application, and the method comprises:

searching for an available Bluetooth device;

receiving advertising information sent by the available Bluetooth device, wherein the available Bluetooth device comprises a first Bluetooth device, and advertising information of the first Bluetooth device comprises universal unique identifier (UUID) information of a service supported by the first Bluetooth device;

storing and parsing the UUID information that is of the service supported by the first Bluetooth device and that is comprised in the advertising information of the first Bluetooth device;

instructing the Bluetooth host to pair with the first Bluetooth device;

instructing the Bluetooth host to report pairing information to the Bluetooth application, wherein the pairing information comprises the UUID information of the service supported by the first Bluetooth device; and in response to pairing with the first Bluetooth device, establishing a service connection to the first Bluetooth device based on the UUID information of the service supported by the first Bluetooth device.

10. The method according to claim 9, wherein the advertising information is Bluetooth low energy advertising.

11. The method according to claim 9, wherein the advertising information is extended inquiry response information.

12. The method according to claim 9, wherein the UUID information of the service supported by the first Bluetooth device comprises UUID information of a voice hands-free profile (HFP) and an advanced audio distribution profile (A2DP).

* * * * *

UNITED STATES PATENT AND TRADEMARK OFFICE
CERTIFICATE OF CORRECTION

PATENT NO. : 11,856,498 B2  
APPLICATION NO. : 17/418293  
DATED : December 26, 2023  
INVENTOR(S) : Xiuhua Liu Page 1 of 1

It is certified that error appears in the above-identified patent and that said Letters Patent is hereby corrected as shown below:

In the Claims

In Column 24, Line 28, in Claim 1, delete "(UUID" and insert -- (UUID) --.

In Column 25, Line 14, in Claim 7, delete "Bluetooth" and insert -- The Bluetooth --.

Signed and Sealed this  
Fourth Day of June, 2024

Katherine Kelly Vidal  
*Director of the United States Patent and Trademark Office*